W. NEWLIN.
Gang Plow.
No. 108,724.  Patented Oct. 25, 1870.
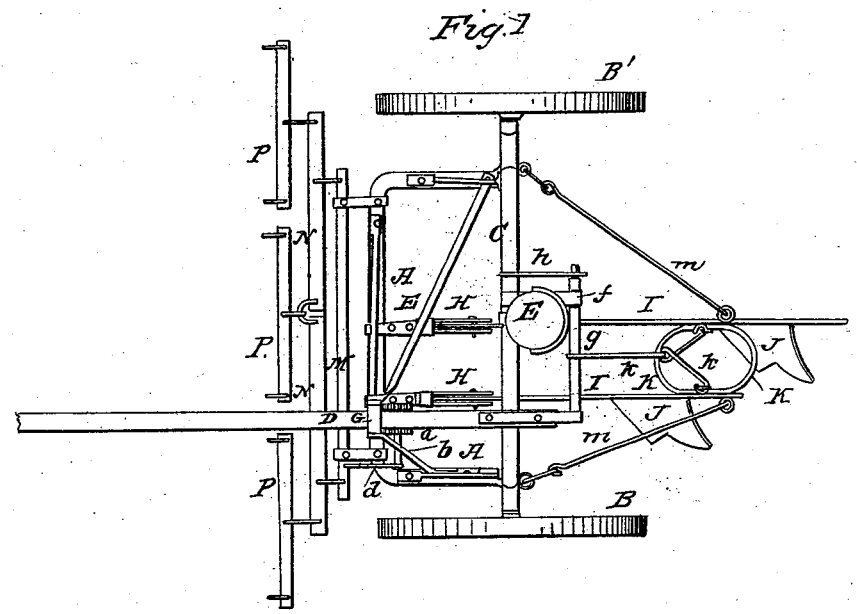
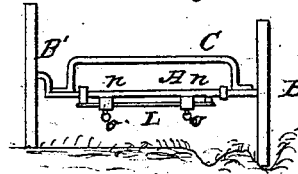
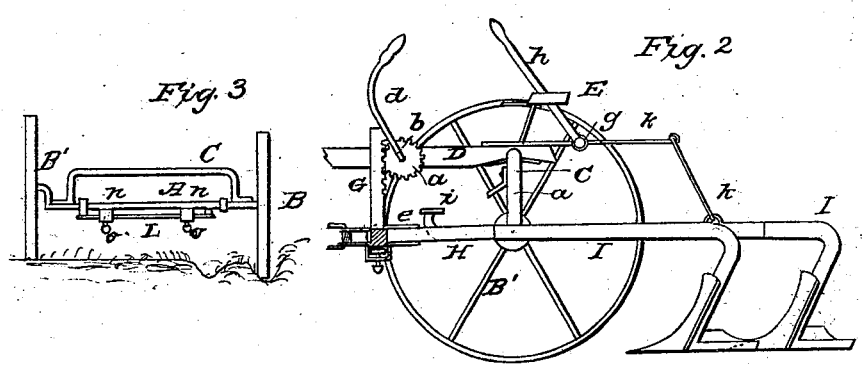
Witnesses  
Harry King  
C. L. Everts
Inventor  
William Newlin  
per Alexander Mason  
Atty

United States Patent Office.

WILLIAM NEWLIN, OF ATTICA, INDIANA.

Letters Patent No. 108,724, dated October 25, 1870.

IMPROVEMENT IN GANG-PLOWS.

The Schedule referred to in these Letters Patent and making part of the same.

*To all whom it may concern:*

Be it known that I, WILLIAM NEWLIN, of Attica, in the county of Fountain and in the State of Indiana, have invented certain new and useful Improvements in Gang-Plows; and do hereby declare that the following is a full, clear, and exact description thereof, reference being had to the accompanying drawing and to the letters of reference marked thereon making a part of this specification.

The nature of my invention consists in the construction and arrangement of a "gang-plow," as will be hereinafter fully set forth.

In order to enable others skilled in the art to which my invention appertains to make and use the same, I will now proceed to describe its construction and operation, referring to the annexed drawing, in which—

Figure 1 is a plan view, and

Figure 2 is a side view of my plow, the furrow-wheel and part of axle being removed in this latter view.

Figure 3 is a front view of the carriage in reduced dimensions.

A represents the axle of my gang-plow, to which the wheels B B' are attached. This axle is bent in the following manner:

A portion of the axle near the center is left straight for a suitable distance, being nearly the entire width of the machine. The ends are then bent at right angles toward the rear for the desired distance. The ends are then bent outward, and on the left side of the machine the furrow-wheel B is placed on the thus outward-bent portion of the axle. On the right side the axle, after being bent outward, turns upward, and then outward again, where the land-side wheel B' is put on the same. The height of the upward-bent portion should be such that when the wheel B drops in the furrow, and the wheel B' runs on top of the ground, the main portion of the axle will be level.

Upon the rear portion of the axle A is placed a cross-bar, C, which is raised up as shown in fig. 3, and supports the driver's seat E. On this bearing-bar C at a suitable point is formed a wrist, on which the pole or tongue D is placed, allowing the same to work loose when the axle is elevated or depressed.

The pole or tongue D passes through an upright staple, G, attached to the front portion of the axle A, and which staple is provided with cogs on its rear edges, as shown in fig. 2. Through the tongue, immediately in rear of said staple, is passed a shaft, *b*, having a lever, *d*, at one end, and a cog-wheel, *a*, on each side of the tongue, which wheels gear with the cogs on the staple, so that by this means the axle may be raised or lowered at will to regulate the depths of the plows while in motion.

To the forward part of the axle A are attached clevises H H, by means of strap-joints *e e*, surrounding the axle, and in each of said clevises is pivoted a plow-beam, I, the front end of which is curved upward, and provided with a lug *i*, which will bear upon the upper edge of the clevis, on both sides of the beam, thus connecting the plow-beams to the axle.

By this arrangement any lateral motion of the plows is prevented, while they are left loose to play upon the axle for the purpose of allowing the plows to be raised from the ground. The lugs *i i* on the point of the beams I prevent the breaking down of the joints formed by the bolts passing through the clevises near the points of the beams in the act of raising the rear ends of the plows.

The plow-beams I I are constructed in any suitable manner, having the plows J J attached at their lower ends, and the beams are connected, near their rear ends, by a spring-ring, K, for the purpose of allowing obstructions to pass between without injury to the plows.

At the rear end of the tongue D and in a bar, *f*, extending from the bearing-bar C, a shaft, *g*, has its bearings, said shaft being provided with a lever, *h*, and by one or more chains or rods, *k*, connected with the plow-beams I I, so that the driver may, at any time, from his seat E, hoist the plows up, raising them out of the ground.

From the outward turns of the axle A to the rear ends of the plow-beams I, run stay or side-rods *m m*, for three specific purposes:

First, for preventing the strain or breakage of plow-beams in case the team should turn suddenly to the right or left while the plows are in the ground.

Secondly, for the purpose of plowing on a curve, as the rods will tighten alternately, and carry my plows on a curve with my wheel.

Thirdly, for the purpose of plowing on sideling ground as the plows will be prevented from sliding around from a line with the wheel.

On the under side of the forward end of the axle A is attached a bar, L, with slips *n* and set-screws *o*, for the purpose of setting the plows either to or from land.

In front of the forward part of the axle A is a bar, M, running parallel and connected with said part of the axle. To the ends of this bar the double-trees N N are attached, and three single-trees are connected with said double-trees, one single-tree, P, being attached to the outer end of each double-tree, and the center single-tree attached to the inner ends of both the double-trees, for the purpose of attaching three horses abreast. The tongue D is placed on one side of the center, so as to have one horse on one side and two horses on the other.

Having thus fully described my invention,

What I claim as new, and desire to secure by Letters Patent, is—

1. In combination with the axle A, the clevises H

H, connected by the strap-joints e e and securing the plow-beams I I, all substantially as set forth.

2. The combination of the bent axle A, tongue D, bearing-bar C, cogged staple G, and bar L, with slips n and set-screws o o, all as shown and described.

3. In combination with the strap-joint clevises H H, the plow-beams I I, the front ends of which are curved as described, and provided with the lugs i i, substantially as and for the purposes herein set forth.

4. The spring-ring K, for connecting the rear ends of the plow-beams, substantially as and for the purposes herein set forth.

5. The arrangement of the shaft g, with its bearings in the tongue D and bar f, the lever h and chains or rods k, substantially as shown and described, and for the purposes set forth.

6. The stay or side rods m m, connecting the plow-beams with the axle, substantially as and for the purposes herein set forth.

In testimony that I claim the foregoing, I have hereunto set my hand this 9th day of July, 1870.

WILLIAM NEWLIN.

Witnesses:
 JOHN S. RICE,
 AUGUSTUS WHITMORE.